United States Patent
Siemons et al.

(10) Patent No.: US 9,868,908 B2
(45) Date of Patent: Jan. 16, 2018

(54) RETORT AND CORRESPONDING OVEN WITH DUCTWORK

(71) Applicant: CLEAN FUELS B.V., Enschede (NL)

(72) Inventors: Roland Siemons, Enschede (NL); Louwerens Baaijens, Rijssen (NL)

(73) Assignee: CLEAN FUELS B.V., Enschede (NL)

( * ) Notice: Subject to any disclaimer, the term of this patent is extended or adjusted under 35 U.S.C. 154(b) by 401 days.

(21) Appl. No.: 14/425,000

(22) PCT Filed: Aug. 27, 2013

(86) PCT No.: PCT/NL2013/050619
§ 371 (c)(1),
(2) Date: Feb. 27, 2015

(87) PCT Pub. No.: WO2014/035239
PCT Pub. Date: Mar. 6, 2014

(65) Prior Publication Data
US 2015/0225651 A1    Aug. 13, 2015

Related U.S. Application Data

(60) Provisional application No. 61/694,277, filed on Aug. 29, 2012.

(51) Int. Cl.
*F16K 11/00*  (2006.01)
*F16K 49/00*  (2006.01)
*C10B 51/00*  (2006.01)
*C10B 7/14*   (2006.01)
*C10B 53/02*  (2006.01)
*C10B 1/04*   (2006.01)

(52) U.S. Cl.
CPC ............. *C10B 51/00* (2013.01); *C10B 1/04* (2013.01); *C10B 7/14* (2013.01); *C10B 53/02* (2013.01); *Y02E 50/14* (2013.01)

(58) Field of Classification Search
CPC ................ A61L 2/00; B09B 3/0075
USPC ............ 422/307; 137/238, 334, 624.11; 210/138, 141, 143, 175
See application file for complete search history.

(56) References Cited

U.S. PATENT DOCUMENTS

2006/0163053 A1*  7/2006  Ershag ............... C10B 47/16
                                               201/13

* cited by examiner

*Primary Examiner* — Monzer R Chorbaji
(74) *Attorney, Agent, or Firm* — Millman IP, Inc.

(57) ABSTRACT

Summary: Method and system for processing a substance in a retort (1) wherein the retort comprises at least one flow deflector internal to the retort. A substance (8) is loaded into the retort (1), the retort (1) is positioned or located in an oven (9), a first (10) and second (11) duct are attacked to the retort, a heat carrier fluidum is passed through the substance (8) in the retort (1) for drying and/or heating the substance inside the retort, an indirect heat is transfer is applied over the wall (3) of the retort (1) and process progress is controlled by means of a controlled indirect heat transfer and/or a flow provided into the retort inlet comprising a heat carrier fluidum.

13 Claims, 6 Drawing Sheets

RETORT AND CORRESPONDING OVEN WITH DUCTWORK

FIELD OF THE INVENTION

The invention relates to a retorting system configured for a batch-wise processing of a substance. The invention also relates to a method of batch-wise processing a substance. More specifically, the invention relates to destructive distillation of a carbonaceous material for production of gas, coke, tar, or similar materials, and specifically to charcoal making.

BACKGROUND ART

The processing of a substance, such as destructive distillation, can be carried out in one of several different ways. One of them is in a continuous process such as by means of a shaft kiln, through which a solid bed of the substance being processed is passed through a zone of favourable process conditions. Another continuous process is a rotary kiln in which a mechanically mixed bed is passed through such a zone. Some other processes are essentially batch-wise, and are carried out by means of, e.g., a batch-operated kiln. If a kiln is used, the substance being processed is brought into direct contact with oxygen that is supplied with combustion air or, alternatively, the substance being processed is brought into direct contact with oxygen that is mixed with gaseous combustion products. The combustion reaction is the source of heat that is needed to create favourable process conditions. Unfortunately part of the substance to be processed is combusted here, so that the process yield is being reduced. A suitable example of a state of the art batch-operated kiln is disclosed in US2004178052A1 ("Process for flash carbonization of biomass"), incorporated herein by reference. An alternative method for processing the substance is by means of a retort. Also a retort is essentially operated batch-wise. Thereby, the substance being processed is kept separated from oxygen in combustion air, and from oxygen mixed with gaseous combustion products. Combustion reactions of the substance being processed are thus minimized. For this reason, retorts are typically suitable to provide higher product yields than kilns. A typical industrial retort, according to the state of the art, is described here below. A typical industrial retort comprises a wall that serves to contain a substance that is being processed, whereby the substance comprises a chemical compound that is being processed or a multitude of different chemical compounds that are being processed. An industrial retort has at least one opening to enable loading the substance into the retort. The opening may or may not be provided with a sealable closure. The wall and, if present, the sealable closure ensure that the substance contained by the retort is prevented from being exposed to foreign matter. Exposure to the foreign matter during the processing of the substance might cause the substance to perform undesired chemical reactions such as oxidizing at least partly, thereby reducing the yield of the process, or the exposure to the foreign matter might result in contamination of the end-product by undesired compounds. The at least one opening of the industrial retort may also serve to unload the retort from reaction products in the form of solid matter or fluid matter or a combination thereof The wall of the retort may also serve to transfer heat from outside the retort to the substance that is being processed inside the retort. This type of heat transfer, according to the state of the art, is referred to as 'indirect'. An industrial retort may also be provided by an entrance opening for the admission of a heat carrier fluidum at an elevated temperature and an exit opening for the expelling of the same fluidum, cooled down to a lower temperature. By flowing through the retort, the fluidum transfers heat to the substance that is being processed inside the retort. According to the state of the art, this type of heat transfer is referred to as 'direct'. Direct heat transfer is usually faster than indirect heat transfer. On the one hand, a fast heat transfer enables a short batch processing cycle, and is therefore favourable to the productivity of a retort as more batches can be processed per unit of time than with indirect heating. On the other hand, however, a fast heat transfer may also be disadvantageous, e.g., with regard to the quality of the processing and thus may be a cause of inefficiency. One quality disadvantage of a fast heat transfer, may be, e.g., the occurrence of breakage of the solid product into pieces that are too small for use or for further processing in some specific applications of the solid product, as a result of thermal shock or rapid steam expansion. An example of undesired breakage of a solid product is the shattering of charcoal lumps into pieces that may fall through the holes of a furnace grate prior to proper combustion. A further disadvantage of direct heat transfer may be that the vaporized products get contaminated with heat carrier fluidum such that liquid recovery following collection of the vapours from the retort is less efficient. A retorting process that relies entirely on direct heat transfer is described by U.S. Pat. No. 2,160,341 ("Process for the carbonization of organic cellulosic materials of vegetable origin"), incorporated herein by reference. In contrast, a retorting process that relies entirely on indirect heat transfer is described by FR2765585(A1) ("Charcoal production by carbonisation of wood"). However, in view of the specific process occurring inside a retort, it is interesting to examine a balance between direct heat transfer and indirect heat transfer. This is explained here below.

As an example, consider a batch-wise operated retort, filled to maximum capacity with a batch of a substance to be processed. In this example the retort has a volume of, e.g., 5 $m^3$, the substance is, e.g., wood, comprising single individual lumps not bigger than, e.g., 100 mm in any dimension, and the voidance of the retort volume is, e.g., 40% (in this example meaning that 40% of the retort's volume comprises gaseous spaces between the woody matter). In the example the substance undergoes a carbonisation process. The carbonisation process can be analysed in several ways that are distinct in scale with regard to place and time. U.S. Pat. No. 2,160,341, referred to above, distinguishes horizontal layers of a substance that are processed one after another from top to bottom of the retort. Subsequently, the respective layers undergo a process of heating and drying followed by the actual carbonisation. For the sake of completeness, we refer to US2004178052A1, mentioned above, which does not describe a retorting process but rather a kilning process, that also describes the process as proceeding in layers, this time from bottom to top.

None of the prior art documents examines a combination of direct and indirect heating.

SUMMARY OF THE INVENTION

The invention provides a retorting system configured for a batch-wise processing of a substance, comprising a retort, an oven, ductwork and a control system, wherein:
a) the retorting system is configured for accommodating the retort in the oven;
b) the ductwork comprises a first and a second duct;

c) the retort comprises at least one retort outlet for extracting a product fluidum during the processing and an opening for loading the retort with the substance prior to the processing and for discharging the processed substance after the processing;

d) the retort is coupled to the first and the second duct of the ductwork, e) the retort comprises at least one flow deflector, internal to the retort, for controlling a direction of a heat carrier fluidum from the first duct via the flow deflector through the retort to the second duct; and f) the control system is arranged to control
 a flow of heat carrier fluidum through the first duct, the retort and the second duct for direct heat transfer to the substance inside the retort and
 an indirect heat transfer to heat the substance in the retort from outside the retort across the retort wall, wherein the indirect heat transfer is applied over the surface of the wall of the retort.

In contrast to the referred analyses, the inventor considers a substance to be processed in the retort not as a single substance but as a collection of physical elements. Each individual one of the physical elements of the substance (that is, e.g., wood changing into charcoal) is so small that a single individual temperature can be assigned to an individual element for all practical purposes. The element may comprise a layer of adjacent individual wood lumps with which the retort is initially filled, if a single temperature at the surface and the inside of the adjacent lumps exists, or the element may comprise an individual wood lump if the lump has a single temperature, or the element may be smaller than an individual wood lump, if there exists a practically large enough temperature gradient inside an individual lump. In the latter case, a wood lump comprises a multitude of elements. The charge of a retort can be considered as comprising a number of elements, each individual one of which has an individual uniform temperature throughout and the individual temperatures may differ from element to element throughout the retort (i.e., in space) and during the retorting process (i.e., in time). During the retorting process, the individual elements are for example subject to several distinct phases,: 1) heating from a starting temperature (usually ambient) to a drying temperature (usually 100-150° C.), 2) drying during which the element's temperature remains constant until the free moisture contained by the element is evaporated, 3) heating from the drying temperature to the temperature of carbonisation ignition (usually approximately 280° C.) followed by 4) a first stage of carbonisation at a further elevated temperature (usually 350° C.), and, if applied, 5) heating to an increased carbonisation temperature followed by 6) second stage carbonisation at that temperature for quality control of the final product (temperatures of 500° C. and even up to 1000° C. are reported in literature). For the sake of completeness, we mention a $7^{th}$ processing phase: cooling of the element to ambient temperature. Note that the term 'carbonisation ignition' involves a new concept, which describes, in view of the phenomenon that there exists a temperature level at which carbonisation is exothermic, that if a carbonisable element is heated up from outside to that temperature level, the released enthalpy of carbonisation causes an elevated element temperature that is higher than the temperature of the element's surroundings. In other words: upon carbonisation ignition, the element is no longer heated passively by its surroundings, but rather the element actively supplies heat to its surroundings. The several distinct elements with which a retort is filled go through the indicated process phases each at their own pace, however, a state of the processing assumed by a specific element at any given moment depends upon the respective states of the processing as assumed by the other elements in the vicinity of the specific element. For example, an element may release heat (after the element has gone through a phase of carbonisation ignition) to an adjacent element (before the adjacent element undergoes carbonisation ignition), or the element may receive heat by conduction from an adjacent element, or the element may receive heat by convection received from, or by condensation of, vapours released from upstream elements. Herein, the expression 'upstream elements' refers to those elements of which the state of the processing has progressed further than that of the elements considered, and the elements considered are 'downstream elements' relative to upstream elements. It is noted that the terms upstream and downstream do not refer to the direction of any fluidum through the substance to be processed. The distinction of the substance to be processed into upstream and downstream elements implies that there exists a profile of processing progress through a set of adjacent elements within the retort. This profile is not stationary in location and time, but rather, starting with upstream elements and followed by downstream elements each element reaches a state of process completion. This can be expressed by stating that process progress has a direction from upstream to downstream elements.

For this invention, it is an important insight that the sources of heating of the various elements of the substance within the retort are not only external to the retort (be it indirect heating or direct heating, according to the state of the art), but also internal (e.g., an exothermic reaction, and also vapour condensation). This is elaborated further below.

Inevitably, condensed liquids attached to a downstream element are converted further as the processing of the downstream elements is carried on according to the subsequent phases described above. E.g., condensed tars are known to undergo a process of secondary carbonisation, releasing a solid carbon deposit as well as a secondary mixture of vapours and gases. The approaches discussed in U.S. Pat. No. 2,160,341 and FR2765585(A1) intend to control the coherence of upstream elements and downstream elements in such a way that condensation of vapours released from upstream elements upon downstream elements is avoided. Of these known approaches, U.S. Pat. No. 2,160,341 aims at reducing condensation in view of the quality of product recovery from the vapours that have left the retort, whereas FR2765585(A1) aims at reducing condensation in view of retorting productivity, by proposing a perforated pipe inside a retort so that short vapour flow trajectories apply. FR2765585(A1) neither recognizes that condensation is also a mechanism of useful energy transfer, nor that condensation may contribute to product yield. In contrast to the publications cited above one of the objects of the invention is to encourage condensation, because 1) the further conversion of the condensed liquids results in increased deposition of solid matter, and therefore in an increased solid product yield, and/or because 2) a surplus of condensate matter (if sufficient is generated during retorting) does not remain attached to the elements but rather is collectable as a retorting product.

The system and method of the invention comprises both direct and indirect heating. This allows e.g. to start an ignition of material inside the retort. The further processing of material can there upon be controlled by the indirect heating to keep the process inside the retort going in a controlled manner, by providing an indirect heat input over the retort wall.

In preferred embodiments the indirect heat transfer is applied non-uniformly over the retort wall. Applying a non-uniform indirect heat transfer allows a more focussed application of indirect heat to the substance for more effective control of the processing.

Each of the various phases occurs, depending on the process taking place inside the retort, at a specific time and location within the retort.

By controlling the flow of heat carrier fluidum through the first duct, the retort and the second duct for direct heat transfer to the substance inside the retort and in addition controlling the indirect heat transfer inside the oven to heat the substance in the retort from outside the retort across the retort wall, wherein the indirect heat transfer is preferably non-uniformly applied over the surface of the wall of the retort the heat input into the elements of the substance in the retort is better controllable and thereby the process inside the retort is better controllable.

It is remarked that in a standard oven the aim is to provide a uniform and steady temperature and thus a uniform and steady heat influx. In the above mentioned FR2765585 the heat is homogeneously applied over the wall of the retort. The system of the invention departs from a standard oven design in providing a controlled preferably non-uniform indirect heat transfer to the retort.

For creating the possibility of promotion of vapour condensation the inventor proposes to generate and maintain a large temperature gradient and/or to generate and maintain a large surface area of low temperature so that condensation may occur across the various elements inside a retort during periods that at least one element upstream is subject to at least one of the phases 4 (first stage carbonisation) or 6 (second stage carbonisation). One characteristic of one or more embodiments of a retorting system according to the invention is that at least one of the phases 1, 3 or 5 (heating of the individual elements) should be controllable at a short duration, since a fast heating rate applied to one upstream element is the cause of a steep temperature gradient vis-à-vis downstream elements. To this end the retorting system is provided with means of controlled direct heat transfer (which is known to be faster than indirect heating), and therefore the retort is provided with at least one inlet for a heat carrier fluidum. To this end the retort is coupled to the first and the second duct of the ductwork. Preferably, this inlet comprises an opening that is additional to the at least one opening already available for discharging the retort from fluid reaction products, since a single opening is preferably not used in the invention for a fluid flow through the single opening in two directions at the same time. The control system is arranged to control a flow of heat carrier fluidum through the first duct, the retort and the second duct for direct heat transfer to the substance inside the retort Controllability of this mechanism for direct heat transfer may be achieved by one or more valves to control the flow rate of a heat-carrier fluidum, or a temperature control of a heat-carrier fluidum, or a composition control of the heat carrier fluidum or a combination of these factors. Another characteristic of one or more embodiments of a retorting system in the invention is to configure the retort such that a relatively long distance between upstream and downstream elements applies, during at least one of the phases 4 (first stage carbonisation) or 6 (second stage carbonisation) applied to upstream elements. Here, a distance is defined relative to the characteristic dimension of an element, and a long distance is, e.g., 5 times the average diameter of a stick-shaped element. To this end the retort of the invention comprises at least one flow deflector, internal to the retort, for controlling a direction of a heat carrier fluidum from the first duct via the flow deflector through the retort to the second duct. The at least one flow deflector may, e.g., be in the shape of a baffle, or of a pipe that deflects a vapour flow or gas flow inside the retort such that at least one internal flow trajectory is made longer, at least in comparison with the trajectory in the retort such as disclosed in FR2765585(A1). A baffle is defined here as an obstruction for checking or deflecting a flow of a fluidum. A further characteristic of the retort in the invention while in operational use is that the control system is arranged to control indirectly heating the substance from outside the retort across the retort wall, wherein the indirect heat transfer is preferably non-uniformly applied over the retort wall. Non-uniformly applying indirect heat transfer allows a heat transfer pattern to be applied across the wall of the retort to the substance. This provides indirect heat transfer at one position which differs controllably from that at another position. This enables a control over the ongoing process inside the retort resulting in controlled locations of upstream and downstream elements inside the retort, i.e. placed in such a manner that the orientation of upstream and downstream elements coincide with the orientation of the flow of product fluidum through the retort that, in turn, is defined by the at least one internal flow deflector and the retort outlet. The indirect heat transfer may be, and in preferred embodiments is, controllable dynamically across the retort wall.

Means to realize a non-uniform, preferably dynamically adjustable, indirect heat transfer to the retort may, for example, comprise a flow baffle outside the retort, or a temperature control of a heat-carrier fluidum that is external to the retort, or other means to control indirect heat transfer such as an adjustable radiation blind inside the retorting system between a source of radiation and the retort, electrical heating or cooling elements on the outside wall of the retort etc.

In preferred embodiments the retort outlet is coupled to one of the first and second duct. This simplifies the system since a duct can be used for a dual purpose, namely not only for transporting a heat transfer fluidum but also for, for instance, extraction of a product fluidum such as pyroligneous liquids.

Preferably the at least one retort outlet and the opening for loading and discharging are at least in part common or overlapping. A single opening is then used for loading the retort with substance and discharging the retort from substance and at least a part of the single loading and discharging opening is used as a retort outlet for extracting a product fluidum during the processing.

Preferably the control system is arranged to dynamically control the distribution of the indirect heat transfer over the retort for dynamically changing the position of the highest indirect heat transfer on the surface of the retort wall. During the processing the position of the highest indirect heat transfer is then adjustable to the progression of the process inside the retort.

Preferably the control system is arranged for moving during processing of the substance inside the retort the area of the highest indirect heat transfer from a position at some distance from the retort outlet towards the retort outlet. In this manner the progress of an ongoing reaction within the substance in the retort can be dynamically guided from a position at some distance from the outlet towards the outlet. In this manner the temperature gradient across the substance that is processed is optimized for condensation.

In preferred embodiments the retorting system is supplied with means to apply controlled direct heat transfer and controlled indirect heat transfer to the retort, as well as a combination thereof. Such means may include valves to control the flow rate of a heat-carrier fluidum for direct heating, a temperature control of a heat-carrier fluidum for direct heating, a temperature control of a heat-carrier fluidum that is external to the retort and that is involved in indirect heat transfer to the retort, or other means to control indirect heat transfer such as an adjustable radiation blind inside the retorting system between a source of radiation and the retort.

Preferably the retorting system is provided with one or more sensors for monitoring the process, wherein an output of said one or more sensors is an input for the control system for controlling direct and/or indirect heat transfer.

The sensor or sensors monitor the process. Such monitoring can for instance involve a temperature at a position at a wall of the retort, or a temperature or composition of a product fluidum flowing from the retort outlet, indicating conditions within the retort and/or how far the reaction has progressed inside the retort, or a mass of the retort together with the contained substance.

The output of the sensor or sensors forms an input for the control system for dynamically controlling a flow of heat transfer fluidum through the first duct, the retort and the second duct and/or indirectly heating the substance in the retort from outside the retort across the retort wall, by changing the intensity of the indirect heat transfer and/or the pattern of indirect heat transfer. The dynamic control of heat transfer fluidum may comprise controlling the temperature and/or pressure and/or flow rate and/or flow direction and/or composition of the heat transfer fluidum or any combination thereof.

In a preferred embodiment of the retorting system, the retort has connectible and disconnectible couplings to the first and second duct for reversibly coupling the retort to the first and second duct. The first and second ducts preferably are provided below the retort.

Preferably the couplings are made by the weight of the retort. By providing the couplings below the retort in such a manner that a tight connection is made between the first and second duct by the weight of the retort and fast and easy coupling of the retort to the duct system can be accomplished.

In preferred embodiments the system comprises an oven inside which a retort can be placed and connected to the first and second duct at the start of a batch-wise retorting process, and out of which the retort can be removed, after disconnecting the retort from the first and second duct upon completion of for instance phase 6 for the entire collection of elements of the substance contained by the retort, so that the retort's contents can start and complete the $7^{th}$ processing phase: cooling of the contents to ambient temperature outside the oven. Meanwhile in preferred embodiments another retort, filled with a fresh substance for processing, can be placed inside the oven and connected to the first and second duct without a need for the oven to cool so that no valuable energy and production time is wasted. With connection any means of coupling the retort to the duct system is meant. For instance when gaskets are used, the gaskets may be positioned at an end opening of the first and second duct. Lowering the retort on the first and second duct so that the gaskets are deformed by the weight of the retort and a gas tight seal is made between the retort and the first and second duct constitutes a connection. In this preferred embodiment, the retorting system also comprises ductwork with connections to the at least two retort openings for the transfer of heat carrier fluidum, product vapour and gas. And in this preferred embodiment, the connections between the ductwork and the retort are connectible and disconnectable, to allow removal of the retort from the oven. In the above described embodiments in which gaskets are used, raising the retort so that the retort no longer rests on the gaskets constitutes disconnection.

Other, common methods of connecting ductwork to retorts include the use of, e.g., screwed of clamped couplings, combined with flexible pipes or hoses. Such components may give rise to difficulties because they may be relatively cold (e.g. with temperatures below 60° C. in view of manual operation, or in view of low temperature resistance of flexible materials), whereas the retorting process proceeds at elevated temperatures (of e.g. 350-1000° C.). The reduced temperatures of the indicated couplings and flexible piping may cause condensation, congestion and leakage due to material deformation. A reliable and simplified method of coupling and decoupling the retort to the ductwork, avoiding all those difficulties, is realized through a further characteristic of one or more embodiments of the invention, according to which the at least first opening and the at least second opening of the retort are located at the same side of the retort, so that the positioning of the at least two retort openings against, and their coupling to, the corresponding ductwork can proceed in one single motion. To this end the number of the at least one internal baffle (flat, or of a different shape, e.g. a pipe) with which the retort in a preferred embodiment is provided, inverting the flow direction of an admitted heat carrier fluidum or of product vapour or product gas, is uneven. Preferably the connections are made below the retort, this allows a fast and easy lowering of a retort in the oven and a fast and easy connecting and disconnection of the retort, increasing the overall speed, reducing the idle time of the oven.

In a preferred embodiment of the retorting system, the system comprises one or more valves and ducts that enable the switching of the flow direction inside the retort during an action of direct heating. This method of operation enables a more specific control of the heating and drying rates across the retort occurring during a direct heating action.

In another preferred embodiment of the retorting system, the system comprises one or more valves and/or ducts for the provision of a chemical reactant directly into the retort, during an action of direct heating, or indirect heating, or a combination of those. The reactant may be or comprise oxygen, steam, air or another chemical compound that is effective at the temperature and pressure conditions prevailing inside the retort. The heat carrier fluidum may have the additional function of being a reactant for instance dependent on the stage of the process.

For instance during a first stage of a process, a heat carrier fluidum is used for directly heating and drying a substance, thereafter indirect heat is provided to arrange upstream and downstream elements inside the retort and to sustain a reaction inside the retort and at some stage of the process, possibly indicated by a sensor signal monitoring the process in the retort, a second heat carrier fluidum, of different temperature or even different composition or both than the first heat carrier fluidum, is provided via the first duct at a temperature above the temperature of the bed, wherein the second heat carrier fluidum also acts as a reactant providing for an endothermic reaction or an exothermic reaction. The system of the invention allows for such flexibility.

In some preferred embodiments the system comprises a means for providing a reaction stopping or reducing agent such as an inert gas to regulate or extinguish an ongoing reaction inside the retort. Such an agent is herein below also called a non-reactant.

In another preferred embodiment of the retorting system, the system comprises valves and ducts that enable the switching of the flow direction through the first and second duct, thus resulting in a reversal of the flow direction through the retort during an action of directly providing a reactant or non-reactant. The switching may be useful to achieve controlled reaction rates along the flow direction across the fixed bed of substance inside the retort. Flow reversal of the first or second heat carrier fluidum may also be useful for a controlled tempering or extinguishing of a reaction.

It is remarked that for both direct and indirect heat transfer in most applications the heat transfer will be positive, i.e. directly or indirectly heat is provided to the substance inside the retort. At least at some stages of almost all processes heat is provided to the substance. However, in embodiments heat can also be removed either by direct or by indirect heat transfer. The system allows for such flexibility.

In another preferred embodiment, the retorting system is provided with means to collect condensates that do not remain attached to the elements of the substance inside the retort, and trickle down to a retort outlet.

The present invention also relates to a method for processing a substance in a retort comprising at least one flow deflector internal to the retort and a control system wherein
- the retort is located in an oven
- a first and second duct are attached to the retort
- a heat carrier fluidum is passed via the first and second duct and via the at least one flow deflector through the substance in the retort for drying and/or heating the substance inside the retort and subsequently
- under the control of the control system, a reaction is initiated in the substance at a position inside the retort, and an indirect heat transfer is applied over the wall of the retort and the further reaction progress is carried out by means of a controlled indirect heat transfer and/or a flow provided into the retort comprising a heat carrier fluidum
- a product fluidum is extracted via a retort outlet (6).

The initiation of the reaction at the position for instance and preferably a position remote from the retort outlet may be first accomplished by the flow and/or temperature of the heat carrier fluidum. To prevent extinguishing of the initiated reaction, the control system applies a preferably non-uniform indirect heat transfer over the surface of the wall of the retort. For instance in embodiments the indirect heat transfer is concentrated at a position at some distance from the retort outlet. The reaction may also be initiated by the concentration of the indirect heat at or near said position, or by a combination of the two heat inputs.

The further reaction progress is controlled by the control system by means of a controlled indirect heat transfer and/or a flow provided into the retort inlet comprising a heat carrier fluidum.

In embodiments a sensor signal indicating the progress of the process is measured by a sensor and said sensor signal is used to control the provision of direct and/or indirect heat in a dynamic manner.

In embodiments a reactant is provided to the substance in the retort for further control of the reaction progress.

In embodiments condensate is collected at the retort outlet.

Preferably a first retort is placed in the oven, the first retort is coupled to the first and second duct, and, after the reaction is completed, the first retort is decoupled from the first and second, duct, taken from the oven, and a second retort is placed in the oven and coupled to the first and second duct. This allows a fast and efficient process.

Preferably the retort comprises one or more sensors for monitoring the process, the one or more sensors are read and the output of the one or more sensors is provided to the control system for controlling indirect heat transfer and/or a flow provided into the retort inlet comprising a heat carrier fluidum and/or a reactant.

These and other aspects of the method and system according to the invention will be apparent from and elucidated with reference to the implementations and embodiments described hereinafter, and with reference to the accompanying drawings, which serve merely as non-limiting specific illustrations exemplifying the more general concept

BRIEF DESCRIPTION OF THE DRAWING

These and other advantageous aspects of the invention will be described in more detail using the following figures.

The figures are not drawn to scale. Generally, identical components are denoted by the same reference numerals in the figures.

DETAILED DESCRIPTION OF PREFERRED EMBODIMENTS

Figure 1:
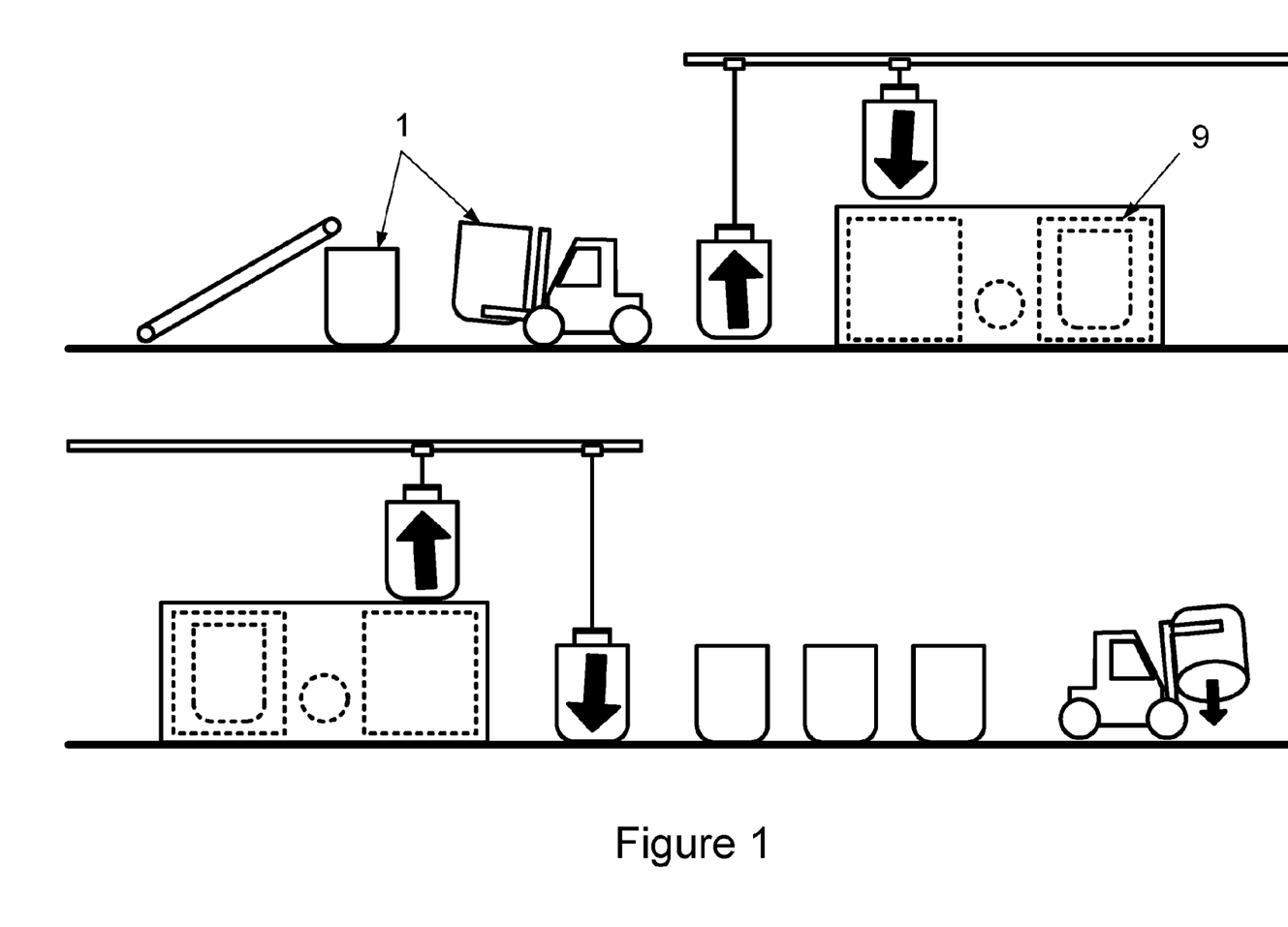
FIG. 1 shows a retorting system with exchangeable retorts, comprising retorts, an oven with two chambers, and a furnace.

FIG. 1 illustrates a retorting system with exchangeable retorts, comprising retorts 1, and an oven 9 with two chambers, and a furnace. The retorts are filled with wood, shown in simplified manner at the top part, left half of FIG. 1. The filled retorts are moved for instance by a fork lift truck and lowered into one of the chambers of oven 2. Said oven has a furnace, in FIG. 1 schematically indicated by the doted circle in the oven. When the process has been completed the retort is lifted out of the oven and the product, for instance charcoal is discharged.

Figure 2:
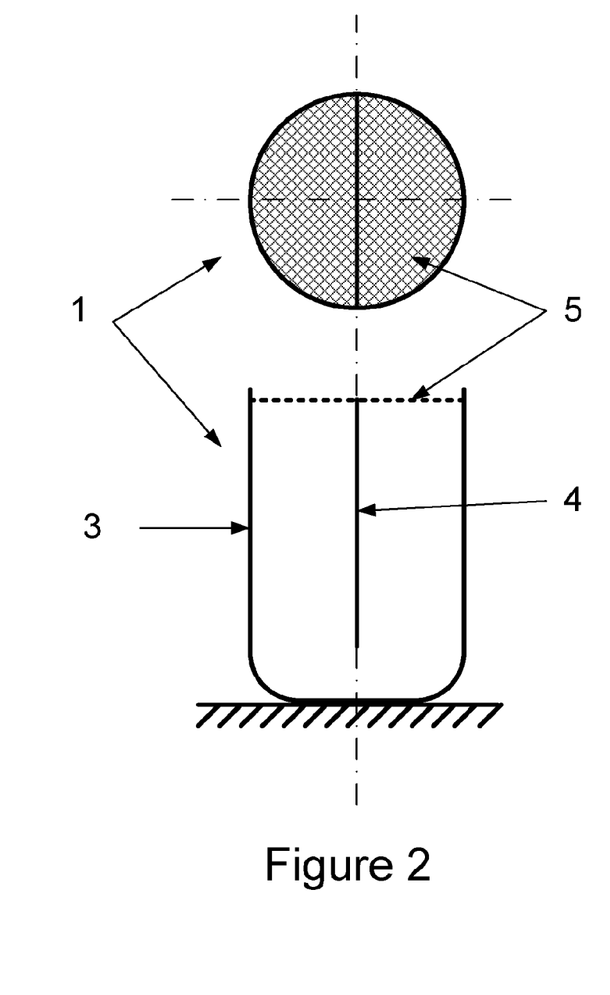
FIG. 2 shows a retort 1 with a retort wall 3, a single flat baffle 4 and a perforated lid 5.
Figure 3:
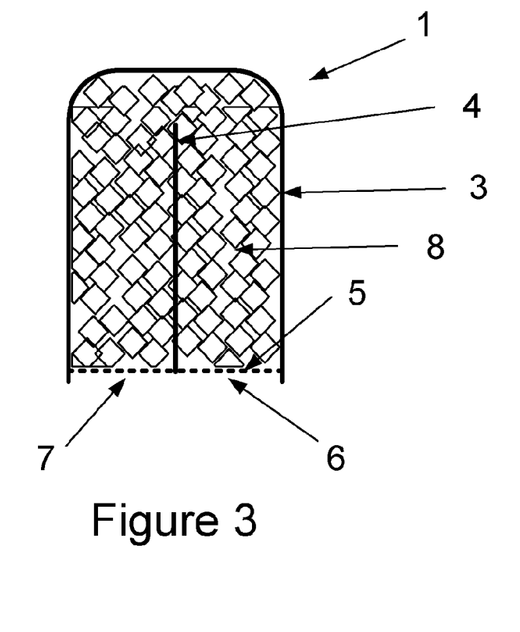
FIG. 3 illustrates the retort of FIG. 2 in which the substance 8 has been loaded.

FIGS. 2 and 3 illustrate an example of a retort for use in a retorting system of the invention. The retort 1 has a retort wall 3 and a baffle 4. The baffle defines two openings in the retort, a retort inlet 7 and a retort outlet 6. The retort is provided in this embodiment, with a permeable lid 5, e.g. a perforated lid. When handling the retort, e.g. for loading the retort into the oven and during processing the lid prevents solid matter from dropping out of the retort. Solid matter may e.g. be the substance to be processed prior to the process, the product being processed during the process or, after the process, the solid processed product. During processing the perforated lid enables a flow into or out of the retort of a fluidum such as a heat carrier fluidum and/or product fluidum. A fluidum can be a gas or a fluid, including water or pyroligneous liquid.

The lid can be moved, to make the opening of the retort free for loading the substance to be processed. This can be done in various manners, for instance by providing the lid with hinges to position the lid in an upright position, by sliding the lid sideways or by removing the lid from the opening. The substance to be processed is then loaded into the retort.

FIG. 3 illustrates a retort in which the substance 8 has been loaded. In this example after loading the retort has been placed upside down. The perforated lid 5 prevents the substance from dropping out of the retort.

Figure 4:
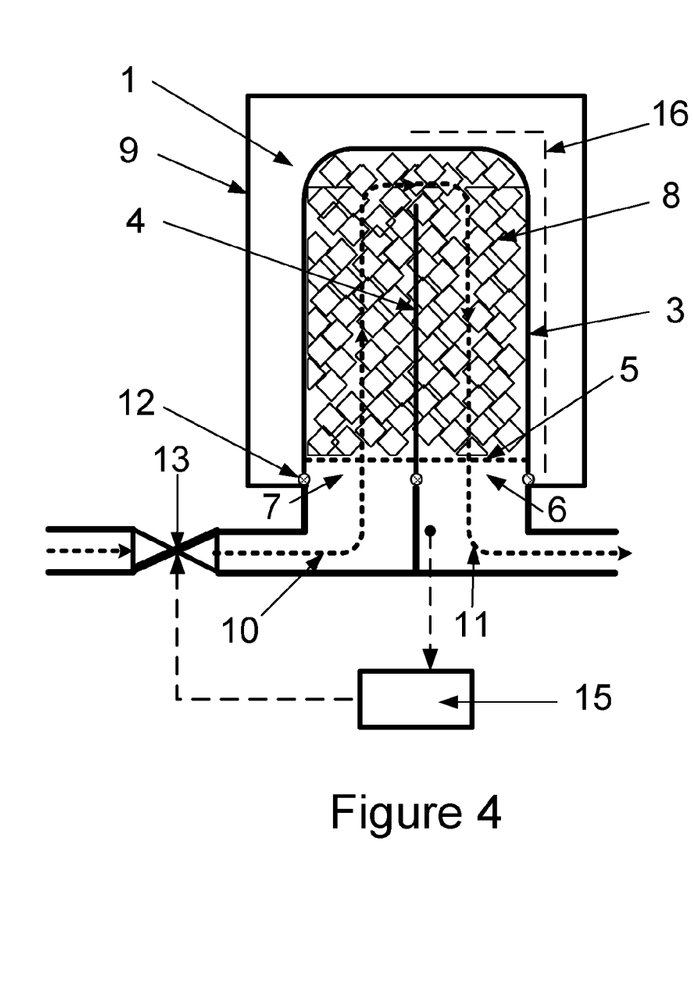
FIG. 4 illustrates the filled retort of FIG. 2 positioned inside an oven 9 for processing the substance 8.

FIG. 4 illustrates the filled retort positioned inside an oven 9 for processing the substance 8. Not shown is a door through a wall of the oven for placing a filled retort and removing the retort after the substance has been processed. To the retort a first duct 10 and a second duct 11 have been coupled by for instance gaskets 12. In this embodiment the ducts are provided below the retort. When the retort is lowered upon the gaskets 12 the weight of the retort provides a coupling between the retort and the duct system. Through the ducts 10 and 11 a flow of a heat carrier fluidum can be established. The heat carrier fluidum flows through the first duct 10, passes the perforated lid 5, and flows through the substance 8. The direction of flow at the far end of the retort is reversed due to baffle 4; the heat carrier fluidum passes the perforated lid 5 and exits the retort at retort outlet 6. The flow of heat carrier fluidum is regulated by control system 15 which, in this embodiment, controls valve 13. Controllability of this mechanism for direct heat transfer may be achieved by the valve 13 to control the flow rate of a heat-carrier fluidum, or by a temperature control of a heat-carrier fluidum by means of a heating means in or prior to the first duct for heating the incoming heat carrier fluidum under control of the control system 15, or both. Also the pressure or density of the heat carrier fluidum may be controlled and/or the composition.

The control system comprises in this example also a stationary radiation blind 16.

The stationary radiation blind 16 controls the indirect heat transfer pattern through radiation to the retort 1. The radiation blind reduces the radiation heat transfer from inside the oven to the surface of the wall of the retort such that the indirect heat transfer is non-uniform, the lesser indirect heat input occurring near the retort outlet 6. The indirect heat transfer by the oven on the outside of the retort is thus non-uniform being more intense at the left hand side of the retort, i.e. at positions or a position at some distance from the retort outlet. In embodiments the radiation blind may be adjustable so that the non uniform indirect heat transfer pattern is adjustable in time, or in other words dynamic. There are various ways in which indirect heat transfer can be applied non-uniformly for instance concentrated at a position remote from the retort outlet. For instance in one embodiment the oven space may be flushed with a heat carrier fluidum for heat transfer to the retort. Also a heating coil can be used to concentrate indirect heat transfer. Where a stationary blind is used, the part of the control system that controls indirect heating is passive. Preferably the part of the control system for regulating indirect heat transfer is active, i.e. it has the capability of varying in time the indirect heat transfer pattern, preferably both in position and in intensity. In such embodiments the control system 15 controls e.g. the position or form of the adjustable radiation blind and/or the position of the surface of the wall of the retort of most intense indirect heat transfer by a gas or solid matter to the retort. The control system is thus arranged to control a flow of heat carrier fluidum through the first duct 10, the retort 1 and the second duct 11 for direct heat transfer to the substance inside the retort and indirectly heating from inside the oven the substance from outside the retort across the retort, wherein the indirect heat transfer is non-uniform and preferably controlled at a position at some distance from the retort outlet 6. The retort comprises a baffle 4 which is a flow deflector for controlling the direction of a heat carrier fluidum from the first duct 10 via the flow deflector 4 through the retort 1 to the second duct 11. The effectiveness of the radiation blind 16 and thereby the indirect heat transfer may also, in embodiments, be dynamically controllable. For instance when the radiation blind is in the form of a Venetian blind with slats with an adjustable angle, the effective rate of blinding can be controlled. If the blind is comprised of several of such Venetian blinds with adjustable slates, not only the effect of blinding in rate can be varied, but also the position of highest indirect heat transfer may be varied. In embodiments the position of the blind may also be adjustable. In FIG. 4 the possible presence of one or more sensors is schematically, and by way of example, indicated by a dot and an arrow from the dot to the control system 15.

Figure 5A:
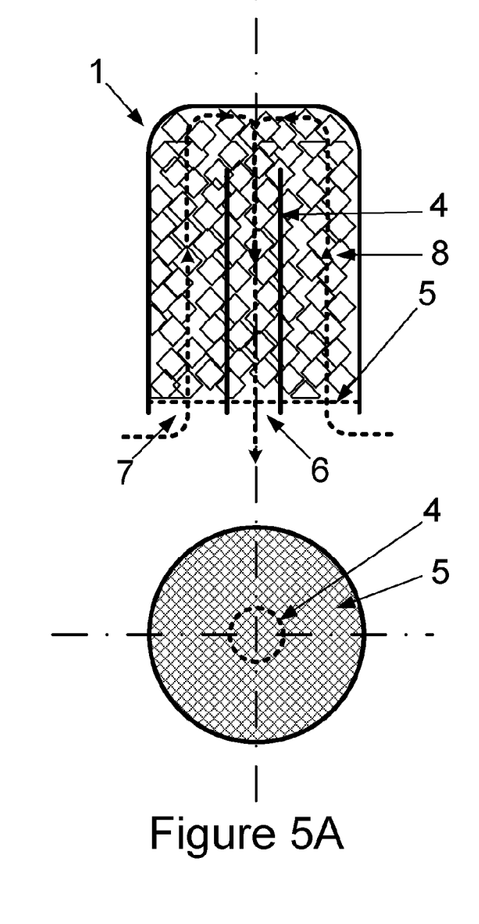
FIGS. 5A and 5B illustrate a retort with a single cylindrical baffle (a pipe) for use in one of three different retorting system embodiments, i.e. in one embodiment with central fluidum supply and annular discharge of product fluidum and/or heat-carrier fluidum in another embodiment with annular fluidum supply and central discharge of product fluidum and/or heat-carrier fluidum, and in another embodiment with alternating flow directions of product fluidum and/or heat carrier fluidum.
Figure 5B:
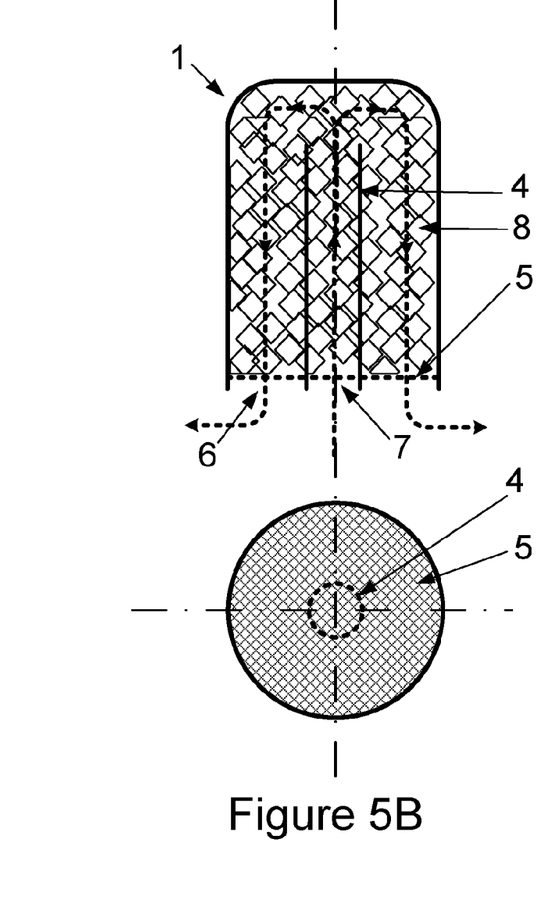

FIGS. 5A and 5B illustrate a further example of a retort for a system according to the invention. In these figures the flow deflector is formed by a central cylindrical baffle in the form of a pipe. The centre of the pipe may form the retort outlet, or the retort inlet, depending on the flow directions of heat carrier fluidum or product fluidum.

FIGS. 5A and 5B thus illustrate a retort with a single cylindrical baffle (a pipe) for use in one of three different retorting system embodiments, i.e. in one embodiment with central supply of heat carrier fluidum and annular discharge of heat carrier fluidum and/or product fluidum (FIG. 5A), and in another embodiment (FIG. 5B) with annular supply of heat carrier fluidum and central discharge of heat carrier fluidum and/or product fluidum, and in a third embodiment with alternating flow directions. The latter may be particularly useful for achieving more uniform profiles of moisture contents and/or temperature and/or reaction rate across the substance inside the retort.

Figure 6:
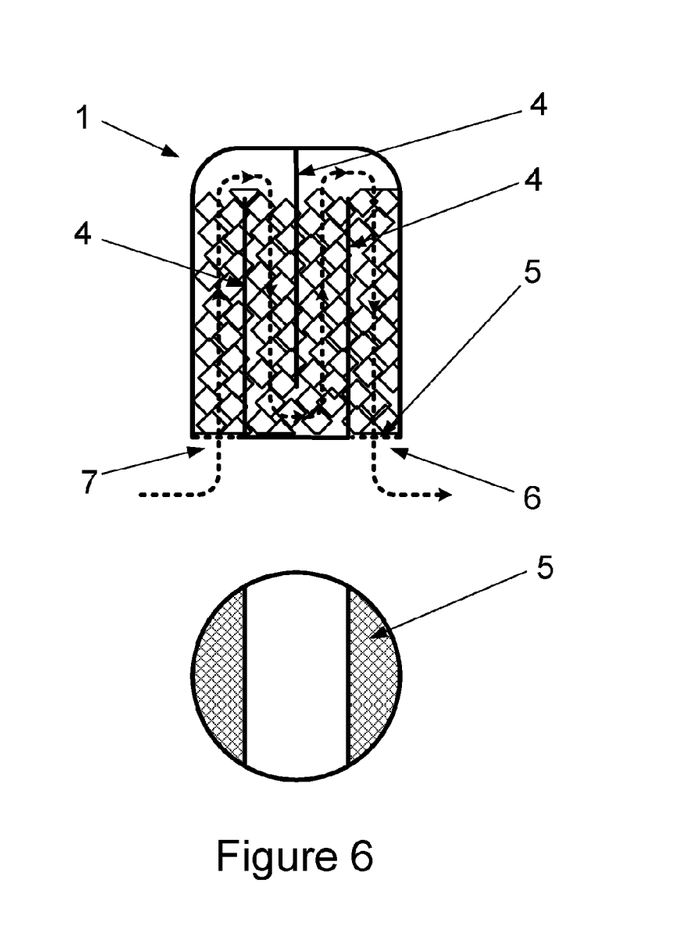
FIG. 6 illustrates a retort with an uneven number of baffles, showing how inlet and outlet of fluidum to respectively from the retort are located at a single side of the retort.

FIG. 6 illustrates a retort with an uneven number of baffles, showing how inlet (5) and outlet of fluidum (6) to respectively from the retort are located at a single side of the retort. Also this embodiment can be used with alternating flow directions for controlling profiles of moisture contents and/or temperature and/or reaction rate across the substance inside the retort.

Figure 7:
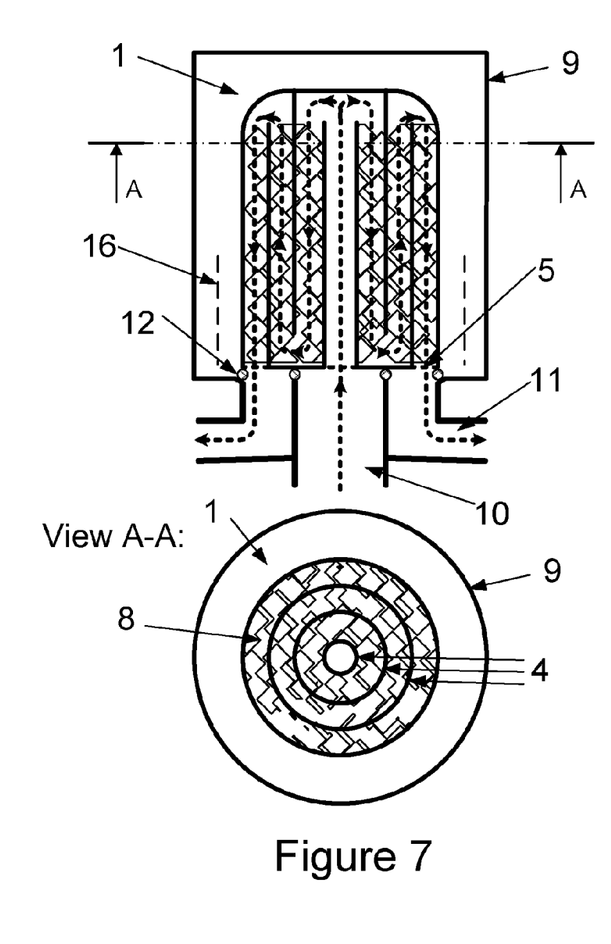
FIG. 7 illustrates an oven with a heat transfer control tool and a retort comprising an uneven number of cylindrical baffles and a perforated lid.

FIG. 7 illustrates an oven 9 with a heat transfer control tool 16 with a retort 1 with an uneven number of cylindrical baffles (4, 4', 4") and a perforated lid. The flow of heat carrier fluidum internally in the retort is guided by the baffles from the first, in this example input, duct 10 to the second, in this example output, duct 11. The flow and/or the temperature of the heat carrier fluidum are controlled by for instance valves at the input and/or output duct which valves are controlled by the control means. The temperature of the heat carrier fluidum may also be regulated under control of the control means. In this manner the direct heat transfer is regulated. The oven has a circular radiation blind 16 to control the indirect heat input from the oven to the retort. The radiation blind in this example can be shifted upward and downward inside the oven to dynamically control the non-uniform pattern of indirect heat transfer. In the position shown in FIG. 7, the radiation blind reduces the indirect heat input near the retort outlet, so that the indirect heat input is larger at a position remote from the retort outlet than at the retort outlet. If shifted to the top of the oven, the radiation blind actively reduces indirect heat transfer to the top of the retort, and allows increased heat transfer near the retort bottom. The latter position is preferred to sustain reaction progress near the finalisation of a processing cycle. The position of highest indirect heat transfer is thereby dynamically controlled.

Figure 8A:
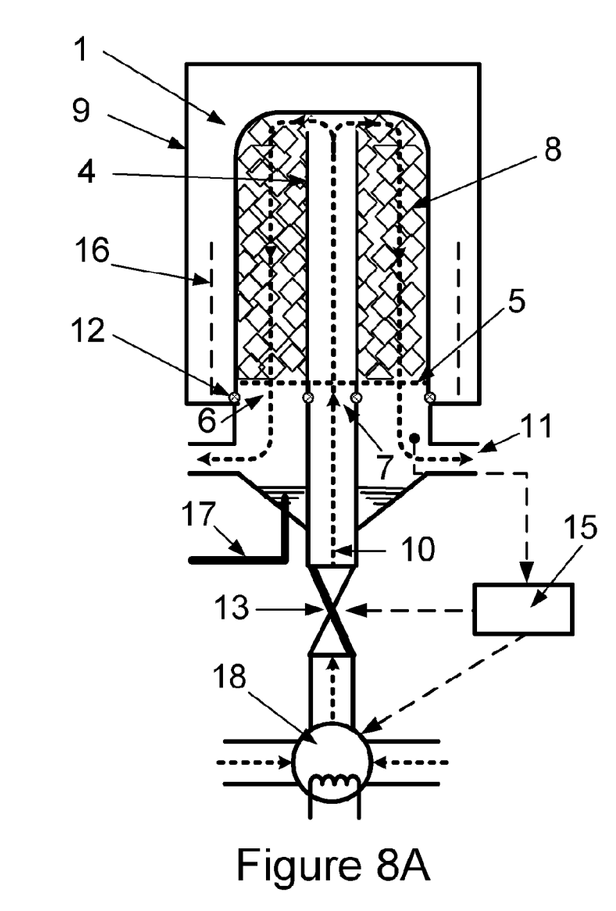
FIGS. 8A and 8B illustrate an oven with a single cylindrical baffle.
Figure 8B:
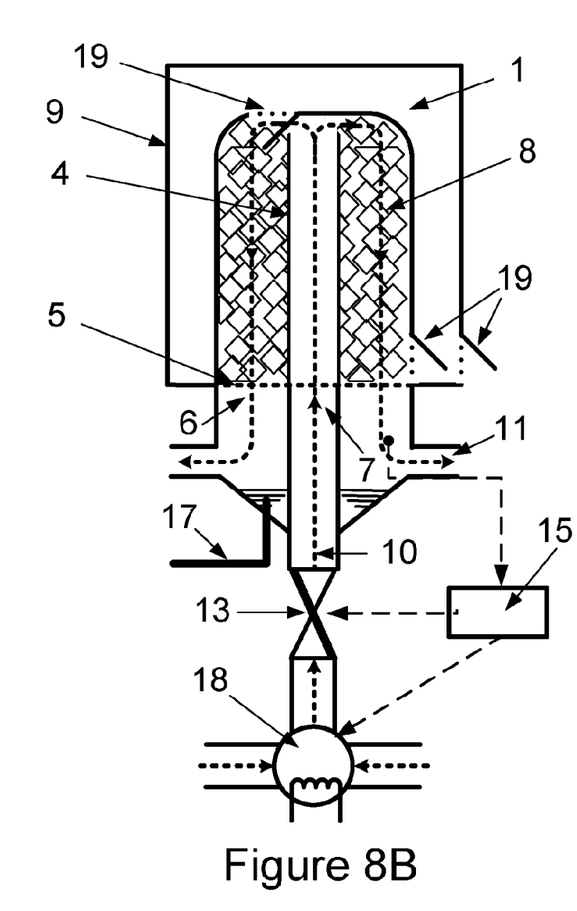

FIG. 8A shows a further embodiment in which a heat carrier fluidum is, under control of the control system 15, flushed through the retort from the inlet duct 10, via the baffle 4 through the substance 8 inside retort 1, to the outlet duct 11. In this example the control system controls the valve 13 to control the flow rate of the heat carrier fluidum. Control means 15 also controls a chamber 18 wherein the temperature and/or composition of the heat carrier fluidum is controlled. In FIG. 8A the heat control is schematically indicated by a heating coil. Furthermore at collecting element 17 a liquid product fluidum is collected. The liquid product fluidum leaves the retort at the retort outlet 6 and is collected at element 17. A gaseous product fluidum can be collected via one of the ducts 10 or 11. These control means have been illustrated in FIG. 8A. Such control means may be present in any of the embodiments of the system according to the invention. Not all control means need to be so elaborate. A chamber in which a mixing of gaseous fluidum can be done is for instance optional. In examples the flow direction of the heat carrier fluidum may be reversed under the control of the control system. FIG. 8B shows an embodiment of the invention is which the retort is stationary in the oven. The retort is provided with loading and discharging opening 19 with a lid at the top respectively bottom of the retort (1), the oven is also provided with lids or doors for loading and discharging a substance.

FIGS. 8A and 8B illustrate an oven with a heat transfer control tool and a single cylindrical baffle. This forms a preferred embodiment. With reference to FIGS. 8A and 8B, but not restricted to said figures, an exemplary method in accordance with the invention, in this example the carbonization of wood, can be described as follows:

After loading the substance, wood, 8 into the retort 1, the retort 1 is placed in the oven 3 (FIG. 8A) or the retort located in the oven is loaded with the substance 8. Not drawn in the FIG. 8A is a lid or door in the wall of the oven 3 which can be opened to place the retort 1 into the oven. For example the retort 1 can be entered into the oven 3 through a side door of the oven, or the retort can be lowered into the oven through a lid at the top of the oven. The retort 1 is connected to the duct system by placing it on gaskets 12. The embodiment of FIG. 8A is a preferred embodiment since this allows the retort to be moved outside the oven to cool down outside the oven, and a filled retort being placed inside the oven while the other retort cools down.

The processing starts by providing a heat carrier fluidum to the substance 8 in retort 1 via inlet duct 10, and as a result the temperature of the substance 8 may rise or a physical or chemical process may occur. At some point of the process progress, after having changed the physical conditions (such as temperature, moisture contents, or chemical composition) of the substance 8 inside the retort, indirect heat is supplied to the retort. As of such point of the process progress, direct heating may or may not be discontinued, so that direct heating and indirect heating may occur concurrently. However, in a preferred operational method, the direct heat transfer is halted, so as to avoid that reaction products are diluted with heat carrier fluidum. In the substance a reaction is initiated at a position within the retort, for instance a position at some distance from the retort outlet 6. The initiation of the reaction can be due to the direct heating or the indirect heating or a combination of both. At the start of the processing, the indirect heat transfer is concentrated at a position remote from the retort outlet by the radiation blind 16.

In this example, once the carbonisation reaction is ignited, the substance elements at said position are no longer heated passively by their surroundings, but rather the elements at said position actively supply heat to their surrounding. The several distinct elements with which a retort is filled go through the various process phases each at their own pace. However, a state of the processing assumed by a specific element at any given moment depends upon the respective states of the processing as assumed by the other elements in the vicinity of the specific element. For example, an element may release heat (after the element has gone through a phase of carbonisation ignition) to an adjacent element (before the adjacent element undergoes carbonisation ignition), or the element may receive heat by conduction from an adjacent element, or the element may receive heat by convection received from, or by condensation of, vapours released from upstream elements. Herein, the expression 'upstream elements' refers to those elements of which the state of the processing has progressed further than that of the elements considered, and the elements considered are 'downstream elements' relative to upstream elements. For this invention, it is an important insight that the sources of heating of the various elements are not only external to the retort (be it indirect heating or direct heating), but also internal (e.g., an exothermic reaction, and also vapour condensation).

By concentrating the indirect heat transfer at a location remote from the retort outlet, the system of the invention is capable of placing initial upstream elements at a position remote from the retort outlet. The process will then progress through the substance in the retort towards the retort outlet. Preferably the position and intensity of the indirect heat transfer is dynamically controlled to control the progress of the processing of the substance inside the retort in a way such that upstream and downstream elements of the substance inside the retort remain oriented to coincide with the direction of the flow of product fluidum through the retort that is defined by the deflector pipe 8 and the retort outlet 6. A dynamical control allows control of the progress of the reaction at various positions. This allows the profile of process progress, i.e. the process wherein the elements of the substance within the retort undergo the various stages, to move controllably towards the retort outlet. Excess condensate that does not stick to the substance inside the retort, trickles down and passes through retort outlet 6, and subsequently is collected at the bottom of outlet duct 11. From there it is collected via line 16.

None of the known documents US2004178052, U.S. Pat. No. 2,160,341 and FR2765585(A1) considers a balance between direct and indirect heating, since all systems depend on a single heat input source. None of the known systems have internal flow deflectors for a heat carrier fluidum. None have means to apply indirect heating non-uniformly or concentrate direct heat at a position remote from the retort outlet. Also, none have means for dynamically controlling position of the indirect heat transfer.

A number of exemplary methods will be now described:

EXAMPLE 1

In the embodiment of FIG. 8A, albeit without radiation screen 16, coconut shell of ambient temperature (20° C.) was loaded into a retort (2 m high, and 1.8 m diameter), while the retort was placed outside the oven with its opening facing upward. The coconut shell consisted of shards with a diameter ranging from 10 to 50 mm, and a thickness of 2-4 mm. The average moisture contents of the coconut shell was 15% on a wet basis, and the total coconut shell mass, including moisture, put into the retort was 1850 kg. After filling, the retort opening was covered with a perforated lid, and the retort was turned upside down. The lid prevented that the coconut shell dropped out of the retort. The retort was then lifted into an oven of ambient temperature, where its central pipe was connected to an inlet duct, and its annulus to an outlet duct. After positioning of the retort, a flue gas from a propane fuelled burner was cooled with air, to obtain a hot gas mixture of 180° C., and this gas mixture was fed into the inlet duct. In the beginning the temperature of the gas that left via the outlet duct was 20° C. In this manner the retort was directly heated with the mixture of flue gas and air. The temperature of the gas that left via the outlet duct rose gradually, and after several hours this was 95° C. During this period, water was evaporated from coconut shell positioned at the closed bottom of the retort which was now, in turned position, above the retort opening. Part of the evaporated water did condensate at the surface of the coconut shell below, the temperature of which was far below condensation point. Much of the condensing water dripped down towards the retort outlet and further into the outlet duct. From there it was collected in a tank. When the temperature of the outlet duct reached 95° C., the direct heating was halted. At that moment the substance inside the retort showed a large temperature gradient of approximately 50 K/m. Next, the top of the oven, above the retort, was heated with gas flames to reach a temperature of 550° C. Whereas the temperature of the retort wall, at its bottom (now turned upward), was still below 370° C. as a result of the direct heating of the substance inside the retort that was applied earlier, the high oven temperature caused a large heat flow into the retort at its upward facing bottom. Taking into account the thickness of the gas layer between oven wall and retort wall, the radiative properties of the gas contained there, and the respective temperatures, it was estimated that local heat transfer to the upward facing retort bottom was approximately 4 kW/m². A similarly large heat flow could not occur at other locations of the retort wall, as the oven was considerably cooler there (e.g. lower than 300° C.). Where the oven temperature is only 300° C., and the retort wall is locally only 240° C. (which were typical local temperatures elsewhere), the local heat transfer to the retort was calculated at at least a factor two lower, in this example at only 0.8 kW/m². The indirect heat input thus, instead of being uniformly applied as in a standard oven, shows a heat input pattern wherein the indirect heat input is at some positions substantially higher, for instance at least 10%, preferably at least 50%, more preferably at least a factor of 2, and in this example a factor 5 higher at an area of highest indirect heat input than at an area of lowest indirect heat input.

A carbonisation reaction was thus initiated at the bottom region of the retort, located far from the retort outlet. The gasses resulting from that reaction flowed down to the retort outlet and further into the outlet duct. On its way down, much of the vapours condensed and settled at the surface of the cold coconut shell, and a surplus trickled down towards the retort outlet and further into the outlet duct. From there it was collected in a second tank. It consisted of pyroligneous liquid. Gases that did not condensate on its way out of the retort were transported via the outlet duct to a furnace where it was combusted. When a mass flow indicator showed that the reaction was complete at the upper region of the retort, the gas combustion located at the top of the oven was stopped, and the oven was purposely heated (again using gas burners) to a temperature of 550° C. at a central level halfway down to the retort height. As the temperature of the substance contained in the retort had risen during the processing, the temperature of the retort wall had increased to 395° C. Taking into account the thickness of the gas layer between oven wall and retort wall, the radiative properties of the gas contained there, and the respective temperatures, it was estimated that local heat transfer to the upward facing retort bottom was now approximately 4 kW/m² at this location of the retort wall, unlike elsewhere where it was considerably lower. Mass flow and temperature indicators showed that the reaction was now active in the same region halfway down to the retort height. The pattern of heat input was thus dynamically controlled. The area of highest indirect heat input shifting from the bottom of the retort to halfway down the retort. The position of the highest indirect heat transfer shifted from a position some distance away from the retort outlet to a position nearer to the retort outlet.

Condensation of pyroligneous liquid continued also during this period of the processing, and its collection could also be continued. When a mass flow indicator showed that the reaction was complete at the central region of the retort, the gas combustion located at the centre of the oven was stopped, and the oven was purposely heated (again using gas burners) at that part of the retort wall that was placed at the bottom of the oven. Mass flow and temperature indicators showed that the reaction was now active in the corresponding region inside the retort (i.e. near the retort lid, placed facing downward inside the oven). Condensation of pyroligneous liquid did no longer occur, as there was no more material available of a sufficiently low temperature. It was decided that the processing was sufficiently completed when the flow of product gas was so low that it could no longer be ignited in the available furnace. After cooling, a total mass of 560 kg charcoal was obtained, with a volatile matter content of only 11% (dry basis). Also, 130 kg of pyroligneous liquid was obtained.

EXAMPLE 2

In another example, after making charcoal with the embodiment and the method of Example 1, the retort was not lifted out of the oven, and the oven was not allowed to cool. Instead, a reactant gas was prepared consisting of steam (40%), carbon dioxide and nitrogen. The reactant gas was heated to a temperature of 950° C. It was blown through the retort containing the ready-made charcoal, using the ductwork and retort inlet 7. Due to its high temperature, the reactant gas was a heat carrier fluidum for the charcoal contained by the retort, and it caused the temperature of the charcoal to increase to 850° C. by means of a direct heating process. The burners inside the oven were also switched on. The burning rate of the burners was controlled individually and dynamically such that local temperatures of the oven followed those of the retort wall at different positions. Heat loss through the retort wall was thus minimized. Where the temperature of the charcoal reached a range of 800-850° C. a gasification reaction of the steam and the carbon dioxide with the charcoal occurred. The gasification reaction was endothermic. A resulting tendency for the charcoal bed to cool down was compensated by a combination of direct heating by the reactant gas that was also a heat carrier, the temperature of which was kept at 950° C., and indirect heating, as the oven temperature was dynamically controlled at local temperatures that were approximately 70° C. higher than local temperatures of the retort wall. The reaction caused the internal surface of the charcoal to increase to 900-1100 $m^2$/g which is a typical quality of active carbon. After applying the reactant gas in the described way during a period of 4 hours, a total amount of active carbon of 290 kg was obtained. The system of the present invention allows for this in situ activation.

In short the invention can be described as follows: Method and system for processing a substance in a retort wherein the retort comprises at least one flow deflector internal to the retort. A substance is loaded into the retort, the retort is located in an oven, a first and second duct are attached to the retort, a heat carrier fluidum is passed through the substance in the retort for drying and/or heating the substance inside the retort, an indirect heat transfer is applied over the wall of the retort and progress is controlled by means of a controlled indirect heat transfer and/or a flow provided into the retort inlet comprising a heat carrier fluidum.

It should be noted that the above-mentioned embodiments illustrate rather than limit the invention, and that those skilled in the art will be able to design many alternative embodiments without departing from the scope of the appended claims. For instance the control system may be a fully automatic control system, or a semi-automatic control system or a manual control system. A manual control system may for instance comprise a control panel with gauges and manually operatable valves wherein an operator opens and closes valves at moments that are indicated by the control system. The control system may also be a control system that usually operates automatically but has manual override possibilities.

In the claims, any reference signs placed between parentheses shall not be construed as limiting the claim.

It will be clear that within the framework of the invention many variations are possible. It will be appreciated by persons skilled in the art that the present invention is not limited by what has been particularly shown and described hereinabove. The invention resides in each and every novel characteristic feature and each and every combination of characteristic features. Reference numerals in the claims do not limit their protective scope.

The invention claimed is:

1. A retorting system configured for a batch-wise processing of a substance (8), comprising a retort (1), an oven (9), ductwork and a control system (15), wherein:
   a) the retorting system is configured for accommodating the retort (1) in the oven (9);
   b) the ductwork comprises a first (10) and a second duct (11);
   c) the retort (1) comprises at least one retort outlet (6) for extracting a product fluidum during the processing, and an opening for loading the retort with the substance prior to the processing and for discharging the processed substance after the processing, the retort outlet (6) being provided at a downwards facing part of the retort (1);
   d) the retort is coupled to the first (10) and the second duct (11) of the ductwork;
   e) the retort comprises at least one flow deflector (4), internal to the retort, for controlling a direction of a heat carrier fluidum from the first duct (10) via the at least one flow deflector (4) through the retort (1) to the second duct (11), whereby the heat carrier fluidum flows from a top of the retort downwards towards the retort outlet;
   f) the control system is arranged to control
   a flow of heat carrier fluidum through the first duct (10), the retort (1) via the at least one flow deflector (4) and the second duct (11) for direct heat transfer to the substance (8) inside the retort (1), and
   an indirect heat transfer to heat the substance (8) in the retort (1) from outside the retort across the retort wall (3), wherein the indirect heat transfer is applied non-uniformly over the surface of the wall (3) of the retort (1) to initiate, in operation, a reaction at a position remote from the retort outlet and to progress the reaction downwards towards the retort outlet,
   wherein the retorting system comprises at the bottom of the retort a collecting element (17) for collecting a condensate formed in the retort and passed through the retort outlet.

2. A retorting system as claimed in claim 1, wherein the indirect heating means are arranged and the control system controls the heating means to provide an indirect heat input which is at least 10% higher at an area of highest indirect heat input than at an area of lowest indirect heat input, wherein the control system comprises a means for providing a temperature gradient of a gas and/or solid matter external to the retort, and/or an emissivity gradient of radiant matter external to the retort, and/or an adjustable radiation blind (16) outside the retort for applying the non-uniform indirect heat transfer.

3. A retorting system as claimed in claim 2, wherein the control system (15) is arranged to dynamically control the distribution of the indirect heat transfer over the retort for dynamically changing the position of the highest indirect heat transfer.

4. A retorting system as claimed in claim 1, wherein the control system is arranged to control one or more of the temperature, mass flow or composition of the heat carrier fluidum.

5. A retorting system as claimed in claim 1, wherein the control system is arranged for changing during processing the position of the highest indirect heat transfer from a position some distance away from the retort outlet (6) to a position nearer to the retort outlet (6).

6. A retorting system as claimed in claim 1, comprising a means for switching the flow direction of the heat carrier fluid during processing.

7. A retorting system as claimed in claim 1, wherein the first (10) and second ducts (11) are arranged at the same side of the retort (1).

8. A method for processing a substance in a retort (1) comprising at least one flow deflector (4) internal to the retort (1) and a control system wherein
   a substance (8) is loaded into the retort (1),
   the retort (1) is located inside an oven (9),
   a first (10) and second (11) duct are attached to the retort (1), a heat carrier fluidum is passed through the substance (8) in the retort (1) through the first (10) and second duct (11) via the at least one flow deflector (4) for drying and/or heating the substance (8) inside the retort, whereby the heat carrier fluidum flows from a top of the retort towards a retort outlet (6), positioned at a downward facing part of the retort, and subsequently, under control of the control system a reaction is initiated in the substance at a position inside the retort (1) remote from the retort outlet (6), and an indirect heat transfer is non-uniformly applied over the wall (3) of the retort (1) and the further reaction progress is carried out by means of a controlled indirect heat transfer and/or a flow provided into the retort comprising a heat carrier fluidum for progressing the reaction downwards towards the retort outlet (6), and a product fluidum is extracted via a retort outlet (6), wherein a condensate is formed in the retort, wherein the condensate formed inside the retort is collected below the retort in a collecting element (17).

9. A method for processing a substance as claimed in claim 8, wherein an indirect heat input is applied which is at least 10% higher at an area of highest indirect heat input than at an area of lowest indirect heat input.

10. A method for processing a substance as claimed in claim 8, wherein the flow of heat carrier fluidum and/or the indirect heat transfer and/or position of the highest indirect heat transfer is dynamically changed.

11. A method for processing a substance as claimed in claim 10 wherein during processing the position of the highest indirect heat transfer is changed from a position some distance away from the retort outlet (6) to a position nearer to the retort outlet (6).

12. A method for processing a substance as claimed in claim 8, wherein a reactant is provided to the substance in the retort for further execution of the reaction progress.

13. A method for processing a substance as claimed claim 8, wherein a first retort is placed in the oven, the first retort is coupled to the first and second duct, and, after the reaction is completed, the first retort is decoupled from the first and second duct, taken from the oven, and a second retort is placed in the oven and coupled to the first and second duct.

* * * * *

UNITED STATES PATENT AND TRADEMARK OFFICE
CERTIFICATE OF CORRECTION

| | | |
|---|---|---|
| PATENT NO. | : 9,868,908 B2 | Page 1 of 1 |
| APPLICATION NO. | : 14/425000 | |
| DATED | : January 16, 2018 | |
| INVENTOR(S) | : Roland Siemons and Louwerens Baaijens | |

It is certified that error appears in the above-identified patent and that said Letters Patent is hereby corrected as shown below:

Column 20, Claim 13, should read:
13. A method for processing a substance as claimed in claim 8, wherein a first retort is placed in the oven, the first retort is coupled to the first and second duct, and, after the reaction is completed, the first retort is decoupled from the first and second duct, taken from the oven, and a second retort is placed in the oven and coupled to the first and second duct.

Signed and Sealed this
Fifth Day of June, 2018

Andrei Iancu
*Director of the United States Patent and Trademark Office*